United States Patent
Labar

(12) 
(10) Patent No.: US 8,141,106 B2
(45) Date of Patent: Mar. 20, 2012

(54) MANAGING ELEMENTS RESIDING ON LEGACY SYSTEMS

(75) Inventor: Dominique J. Labar, Brussels (BE)

(73) Assignee: Computer Associates Think, Inc., Islandia, NY (US)

(*) Notice: Subject to any disclaimer, the term of this patent is extended or adjusted under 35 U.S.C. 154(b) by 1023 days.

(21) Appl. No.: 11/291,450

(22) Filed: Dec. 1, 2005

(65) Prior Publication Data
US 2006/0143340 A1  Jun. 29, 2006

Related U.S. Application Data

(60) Provisional application No. 60/632,127, filed on Dec. 1, 2004.

(51) Int. Cl.
*G06F 3/00* (2006.01)
*G06F 17/30* (2006.01)
*G06F 15/167* (2006.01)

(52) U.S. Cl. ......... 719/328; 707/756; 709/213; 715/748

(58) Field of Classification Search .......... 709/203, 709/249; 713/201; 719/301
See application file for complete search history.

(56) References Cited

U.S. PATENT DOCUMENTS

| | | | | |
|---|---|---|---|---|
| 6,065,043 | A * | 5/2000 | Domenikos et al. | 709/203 |
| 6,604,100 | B1 * | 8/2003 | Fernandez et al. | 1/1 |
| 6,810,429 | B1 * | 10/2004 | Walsh et al. | 709/246 |
| 2002/0138582 | A1 * | 9/2002 | Chandra et al. | 709/206 |
| 2003/0120600 | A1 * | 6/2003 | Gurevich | 705/50 |
| 2004/0010521 | A1 * | 1/2004 | Li et al. | 707/200 |
| 2004/0015928 | A1 * | 1/2004 | Seelemann | 717/156 |
| 2004/0111730 | A1 * | 6/2004 | Apte | 719/330 |
| 2004/0255048 | A1 * | 12/2004 | Lev Ran et al. | 709/249 |
| 2005/0033726 | A1 * | 2/2005 | Wu et al. | 707/1 |
| 2005/0044165 | A1 * | 2/2005 | O'Farrell et al. | 709/213 |
| 2006/0031311 | A1 * | 2/2006 | Whitney et al. | 709/206 |

FOREIGN PATENT DOCUMENTS

| | | |
|---|---|---|
| WO | WO 02/075597 | 9/2002 |
| WO | WO 02/077844 | 10/2002 |

* cited by examiner

*Primary Examiner* — Lechi Truong
*Assistant Examiner* — Tuan Dao
(74) *Attorney, Agent, or Firm* — Pillsbury Winthrop Shaw Pittman LLP

(57) ABSTRACT

In certain embodiments, a method includes receiving, from a user of a local system, a request for a list of elements residing on the local system. Elements residing on the local system and elements residing on a legacy system are identified. The legacy system is incompatible with the local system. Both the legacy elements and the local elements are presented, to the user of the local system, as residing on the local system.

27 Claims, 8 Drawing Sheets

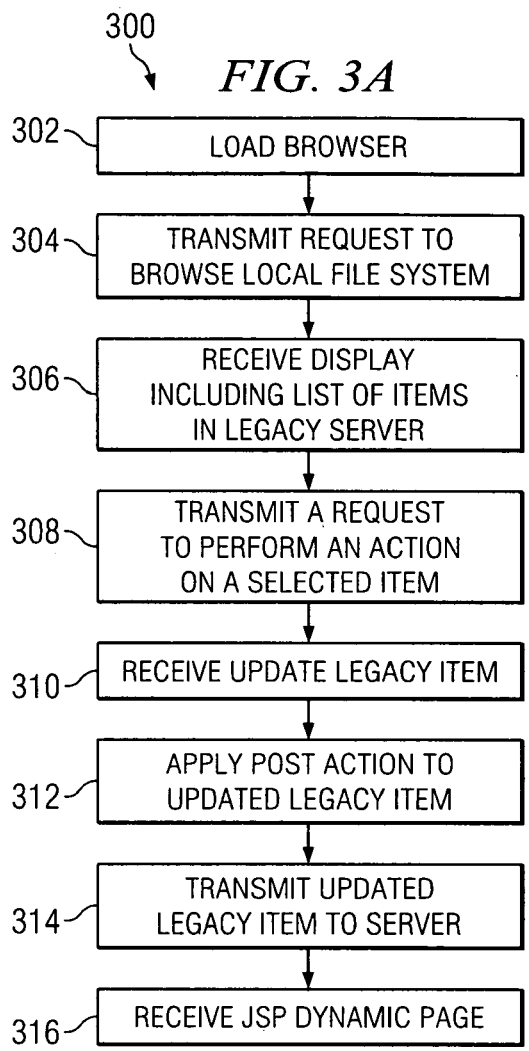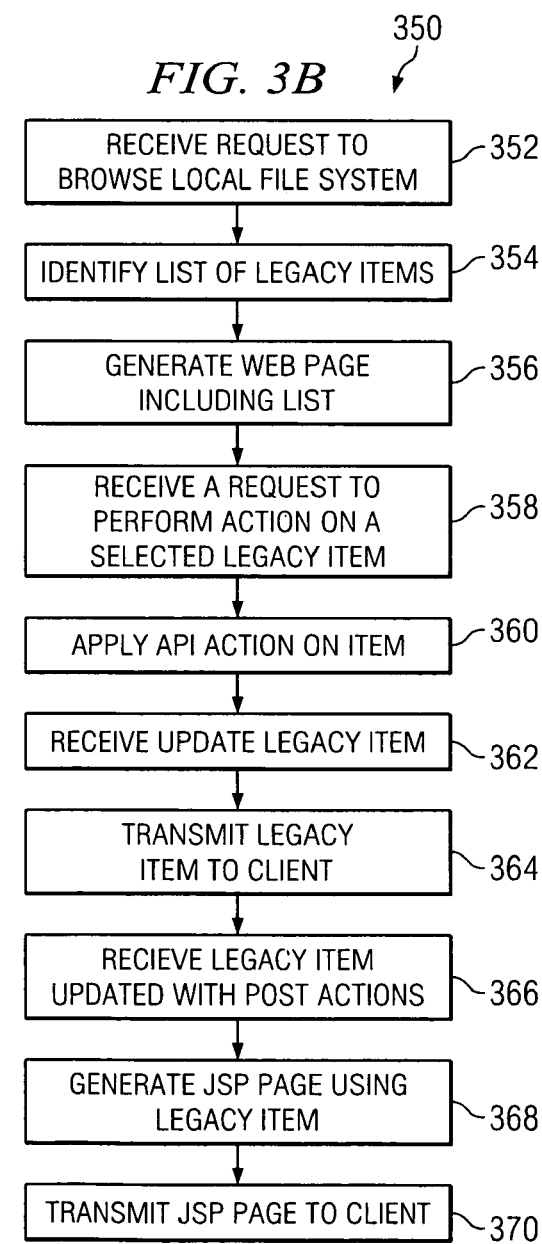

MANAGING ELEMENTS RESIDING ON LEGACY SYSTEMS

RELATED APPLICATION

This application claims the benefit of U.S. Provisional Application No. 60/632,127 filed Dec. 1, 2004.

TECHNICAL FIELD

This invention relates to managing documents, and more particularly to managing elements residing on legacy systems.

BACKGROUND

Generic software applications are frequently used to access external data sources when processing a request from a user. These applications typically require that a user provide technical details in order to access external data sources. For example, the user frequently must provide a database name, a table name, a column name, and/or a link column in order to access the external data sources. After these details are provided, such applications retrieve and display the information. As a result, the user is fully aware that they are accessing external data sources. If integration of local data and external data is desired, the user may then manually integrate the local and external data.

SUMMARY

In certain embodiments, a method includes receiving, from a user of a local system, a request for a list of elements residing on the local system. Elements residing on the local system and elements residing on a legacy system are identified. The legacy system is incompatible with the local system. Both the legacy elements and the local elements are presented, to the user of the local system, as residing on the local system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A and 3B are flow charts illustrating example methods for adding elements to or updating elements in legacy system of FIG. 1 in accordance with one embodiment of the present disclosure.

DETAILED DESCRIPTION

Figure 1:
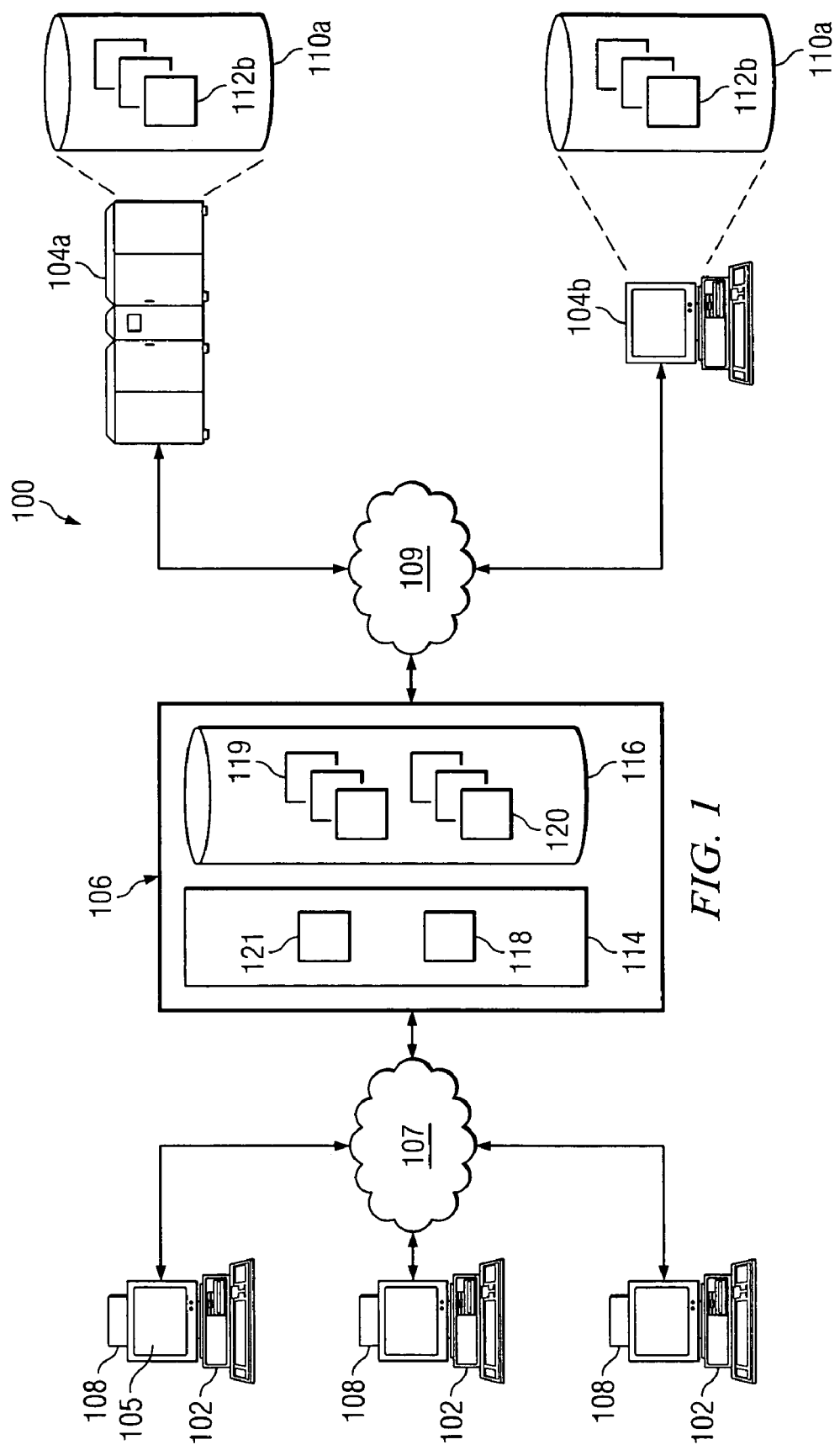
FIG. 1 illustrates a data management system in accordance with one embodiment of the present disclosure.

FIG. 1 illustrates a data management system 100 for exchanging legacy elements 112 with clients 102. Legacy, as used herein, means any component, object, value, variable, and/or data and/or data schema generated by a system developed previous to clients 102 and not directly processible, accessible, or otherwise capable of communicating with later developed systems such as clients 102. For example, legacy systems 104 are typically database management systems (DBMSs) running on a mainframe 104*a* or minicomputer 104*b*. In general, system 100 is operable to allow the exchange of legacy files or elements between legacy systems 104 and clients 102. In some embodiments, the exchange of files or elements is transparent to the user of clients 102. After receiving legacy elements 112, system 100 may integrate the information from legacy systems 104 into the logical information space of clients 102 and may represent the information as residing on client 102. Computer systems such as clients 102 used for generic data extraction, reporting, and visualization, typically need to be able to access data from a wide variety of sources, including sources that are no longer directly compatible with current systems. For example, enterprises may have invested considerable time and money in legacy systems 104 that are not directly compatible with clients 102 and desire that the clients 102 work with or at least retrieve data from legacy systems 104. In addressing this incompatibility, system 100 may use thin client 108 and managing engine 118 to provide a way of managing legacy elements 112. For example, system 100 may manage all legacy elements 112 including different versions of the same element 112 and may store the particular element's history. Typically, system 100 converts information to forms compatible with client 102 and/or legacy system 104. As a result, legacy elements 112 may be seamlessly integrated into the logical information space of clients 102 and may present a user-friendly, descriptive interface for browsing and/or performing actions on legacy elements 112 without requiring the user to provide (or even know) technical and/or logical details or even be aware that the legacy elements 112 reside on legacy system 104. Alternatively or in combination, legacy element 112 may include an indication that the file is be transferred in its native format. In this case, legacy element 112 may be converted to a format compatible with client 102 at a later point in time.

At a high level, system 100 is includes or is communicably coupled with one or more clients 102, legacy systems 104, and server 106. In other words, data management system 100 is typically a distributed client/server system that allows users of clients 102 to retrieve and/or perform actions on legacy elements 112 residing in legacy systems 104. But system 100 may be any other suitable environment without departing from the scope of this disclosure. Generally, "dynamically," as used herein, means that certain processing is determined, at least in part, at run-time based on one or more variables. Whereas the term "automatically," as used herein, generally means that appropriate processing is substantially performed by at least part of data management system 100. It should be understood that "automatically" further contemplates any suitable administrator or other user interaction with system 100 without departing from the scope of this disclosure.

Client 102 is typically a computer that requests and receives services and information from server 106 via network 107. In the illustrated embodiment, client 102 includes a graphical user interface (GUI) 105 and a thin client 108. It will be understood that there may be any number of clients 102 coupled to server 106. In general, client 102 may include input devices, output devices, mass-storage media, processors, memory, interfaces, communication ports, or other suitable components for communicating requests to server 106 and receiving responses via network 107. For example, client 102 may comprise a computer that includes an input device, such as a keypad, touch screen, mouse, or other device that can accept information, and an output device that conveys information associated with the operation of server 106 or clients 102, including digital data, visual information, or any other suitable information. Both the input device and output device may include fixed or removable storage media such as magnetic computer disk, CD-ROM, or other suitable media to both receive input from and provide output to users of client 102 through a portion of a data display, namely GUI 105. As used in this document, client 102 is intended to encompass a personal computer, a workstation, network computer, kiosk, wireless data port, personal data assistant (PDA), one or more processors within these or other devices, or any other suitable processing device. The present disclosure contemplates computers other than general purpose computers as well as computers without conventional operation systems.

GUI 105 comprises a graphical user interface operable to allow the user of client 102 to interface with at least a portion of system 100 for any suitable purpose. Generally, GUI 105 provides the user of client 102 with an efficient and user-friendly presentation of data provided by system 100, such as charts and tables. GUI 105 may comprise a plurality of displays having interactive fields, pull-down lists, and buttons operated by the user. It should be understood that the term "graphical user interface" may be used in the singular or in the plural to describe one or more graphic user interfaces in each of the displays of a particular graphical user interface. Further, GUI 105 contemplates any graphical user interface, such as a generic web browser, that processes information in system 100 and efficiently presents the information to the user. Server 106 can accept data from client 102 via the web browser (e.g., Microsoft Internet Explorer or Netscape Navigator) and return the appropriate Hyper Text Markup Language (HTML) or extensible Markup Language (XML) responses. In addition, GUI 105 provides an interface with thin client 108 for exchanging elements with legacy system 104.

Thin client 108 is typically software and may be written or described in any appropriate computer language including, for example, C, C++, Java, J#, Visual Basic, assembler, Perl, any suitable version of 4GL, or any combination thereof. As used herein, software generally includes any appropriate combination of software, firmware, hardware, and/or other logic. In general, thin client 108 processes converted legacy elements 112 and/or interacts with the user via GUI 105. For example, thin client 108 may perform one or more of the following tasks: receive and process selections indicated by the user via GUI 105, transmit documents to server 106 including list and/or parameters, transmit actions to perform on legacy elements 112, receive converted legacy elements 112, execute local post conversion actions, generate execution reports, transmit execution reports to server 106, or others. In some embodiments, thin-client 108 may be executed from a browser program and communicated with server 106 using the HTTP or other similar protocol. In some embodiments, thin client 108 includes a web-based application, perhaps running Java Server Pages (JSP) technology, to facilitate communications with legacy system 104 (such as mainframe 104a or computer 104b). In this embodiment, thin client 108 may include a software component initially packaged into a Java Archive file and may be running, for example, as one or more Java Applets under the control of a browser's Java plugin, or other similar technology. In this case, Sun's Java Runtime JRE may be directly downloaded from server 106 in order to execute Applet logic. Thin client 108 may hide the details of the existing Internet download and upload protocols. As a result, communication between thin client 108 and legacy systems 104 may be fully transparent. In the illustrated embodiment, thin client 108 is coupled to legacy elements 112 via network 107 and server 106.

Network 107 facilitates wireless or wireline communication between clients 102 and any other local or remote computer, such as legacy systems 104 and/or server 106. Illustrated network 107 comprises two sub-nets or virtual LANS, 107a and 107b, respectively. Indeed, while illustrated as two networks, network 107 may be a continuous network without departing from the scope of this disclosure, so long as at least portion of network 107 may facilitate communications between thin client 108 and one or more of legacy systems 104. In other words, network 107 encompasses any internal or external network, networks, sub-network, or combination thereof operable to facilitate communications between various computing components in system 100. Network 107 may communicate, for example, Internet Protocol (IP) packets, Frame Relay frames, Asynchronous Transfer Mode (ATM) cells, voice, video, data, and other suitable information between network addresses. Network 107 may include one or more local area networks (LANs), radio access networks (RANs), metropolitan area networks (MANs), wide area networks (WANs), all or a portion of the global computer network known as the Internet, and/or any other communication system or systems at one or more locations.

As mentioned above, system 100 includes, invokes, executes, references, or is communicably coupled with a plurality of legacy systems 104. Each legacy system 104 is generally any logical or physical data repository, whether local or remote, that is incompatible with client 102. For example, each legacy system 104 may have been developed in the past and, thus, inherited languages, platforms, and techniques developed earlier than current technology. This earlier technology is frequently incompatible with current technology. In the illustrated embodiment, system 100 includes two legacy systems 104a and 104b. In this example, first legacy system 104a is a mainframe 104a and second legacy system 104b is a personal computer 104b. Examples of legacy system 104 include mainframes, relational databases, object-oriented databases, file systems, document storage systems, or any other suitable storage or data structure. In one example, legacy system 104 comprise a mainframe including a database accessed through proprietary statements. In this example, legacy system 104 may be any computer or processing device such as, for example, a blade server, a server pool, general-purpose personal computer (PC), Macintosh, workstation, Unix-based computer, or any other suitable device. Legacy system 104 may be adapted to execute any operating system including Linux, UNIX, Windows Server, or any other suitable operating system. In another example, legacy system 104 may also include XML documents, Btrieve files, flat files, CSV files, text files, and/or other data structures or objects. In yet another example, legacy system 104 may be a computing device similar to client 102, but not directly accessible or compatible with client 102.

Each legacy system 104 typically includes a memory 110 for storing legacy elements 112. Memory 110 may include any memory or database module and may take the form of volatile or non-volatile memory including, for example, magnetic media, optical media, Random Access Memory (RAM), Read Only Memory (ROM), removable media, or any other suitable local or remote memory component. In the illustrated embodiment, memory 110 includes legacy elements 112 but may include other suitable information. Legacy elements 112 are one or more data entries or any data structures not directly accessible and/or compatible with client 102. In general, legacy elements 112 may comprise files, tables, documents, and/or other data structures. As mentioned above, legacy element 112 may include an indication that it should be transferred in its native format. In this case, system 100 not convert legacy element 112 to a format compatible with client 102 while it is being transferred to client 102. For example, the indication may be a parameter "Binary." In this case, the indication instructs system 100 to transfer the file in binary without attempting conversion of legacy element 112. In some embodiments, legacy elements 112 may store or define various data structures such as Java objects, text files, eXtensible Markup Language (XML) documents, Virtual Storage Access Method (VSAM) files, flat files, Btrieve files, comma-separated-value (CSV) files, internal variables, or one or more libraries. In short, legacy elements 112 may comprise one table, file or object or a plurality of tables, files or objects stored on one computer or across a plurality of computers in any appropriate format.

Illustrated server 106 includes memory 116 and processor 114 and comprises an electronic computing device operable to receive, transmit, process and store data associated with system 100. For example, server 106 may be any computer or processing device such as, for example, a blade server, general-purpose personal computer (PC), Macintosh, workstation, Unix-based computer, or any other suitable device. Generally, FIG. 1 provides merely one example of computers that may be used with the disclosure. For example, although FIG. 1 illustrates one server 106 that may be used with the disclosure, server 106 can be implemented using computers other than servers, as well as a server pool. Server 106 may be adapted to execute any operating system including Linux, UNIX, Windows Server, z/OS or any other suitable operating system. But, the present disclosure contemplates servers other than general purpose computers as well as servers without conventional operating systems. According to one embodiment, server 106 is a Web-based application running Sun JSP technology.

Memory 116 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 116 includes one or more application program interfaces (API's) 119 and client profiles 120 but may include any other suitable information. Each API 119 comprises a conventional application program interface providing an interface between server 106 and legacy systems 104. For example, API 119 may convert, translate, or otherwise modify data, calls, and other elements between formats. In some embodiments, each API 119 provides an interface for a different legacy system 104 such as a legacy mainframe, a legacy PC, or others. In some embodiments, a single API 119 provides multiple interfaces, each to a particular legacy system 104. In general, API 119 includes a set of routines, protocols, and/or tools used to perform actions on and/or retrieve legacy elements 112. API 119 may comprise a file, script, executable, template or any other suitable description such that server 106 may transmit commands to legacy systems 104. API 119 may be created or supplied by server 106, a third party, or any other suitable user of system 100. In some embodiments, API 119 includes either source code for class definitions written in or an executable code for class definitions based on any appropriate language such as, for example, C, C++, Java, Pert, and others.

Client profiles 120 includes one or more entries or data structures that describes actions associated with legacy elements 112. For example, client profile 120 may include, indicate, or reference one or more of the following: a client identifier, a legacy element identifier, an action type, a time, a date, element type, reason codes, completion codes, parameters, a success/failure indication, and/or any other suitable information. In some embodiments, client profile 120 includes information associated with multiple actions. For example, client profile 120 may include information identifying multiple actions performed on a particular legacy element 112 and/or legacy elements 112 residing on a particular legacy system 104. In addition, client profile 120 may be associated with an individual and/or multiple legacy elements 104. Client profile 120 may be stored in any suitable format such as, for example, an XML document, a flat file, comma separated value CSV file, a name-value pair file, SQL table, or others. Indeed, each profile 120 may be a temporary or a persistent data structure without departing from the scope of the disclosure. Client profile 120 are typically generated or loaded based on data or other information received or retrieved from legacy system 104. But client profile 120 may also be created, updated, or supplied by client 102, a third-party software vendor, or any appropriate user of any computer in system 100, loaded from a default profile, or received via network 107.

Illustrated server 106 also includes processor 114. Processor 114 executes instructions and manipulates data to perform the operations of server 106 such as, for example, a central processing unit (CPU), an application specific integrated circuit (ASIC) or a field programmable gate array (FPGA). Although FIG. 1 illustrates a single processor 114 in server 106, multiple processors 114 may be used according to particular needs and reference to processor 114 is meant to include multiple processors 114 where applicable. Illustrated processor 114 executes software, such as example management engine 121 and reporting module 118. As with other disclosed example software, reporting module 118 is any software, hardware, firmware, or combination thereof operable to generate reports regarding actions associated with legacy elements 112. For example, reporting module 118 may receive information associated with legacy elements 112 and automatically generate and/or update client profiles 120 based, at least in part, on the received information. In some embodiment, reporting module 118 receives information indicating whether an action performed on a particular legacy element 112 was a success or failure and updates an associated client profile 120. In addition, reporting module 118 may generate reports based, at least in part, on client profiles 120 and transmit the reports to clients 102. The reports may indicate a list of actions performed on a particular legacy element 112 or group of legacy elements 112. The reports may include additional information associated with legacy element 112. Reporting module 118 may be written in or based on any appropriate computer language including C, C++, Java, Visual Basic, Perl, and others.

Management engine 121 can include any software comprising instructions, mappings, algorithms, or any other directive used to convert legacy elements 112 to forms compatible with clients 102. For example, management engine 121 may convert between a legacy element 112 coded in one character set to a different character set. In some embodiments, management engine 121 facilates binary transfer between legacy systems 104 and clients 102. In addition, management engine 121 may receive a request to perform actions on legacy elements 112 and transmits the request to the appropriate legacy systems 104. In some embodiments, the request may include associated parameters. In this case, management engine 121 may validate the parameters prior to transmitting the request to legacy system 104. After receiving the request, management engine 121 may execute the requested action using API 119. In addition, management engine 121 may receive documents from clients 102 and, in response to at least receiving the documents, dynamically generate JSP pages. For example, the documents may comprises documents in which post-API actions are performed by clients 102. In some embodiments, management engine 121 receives documents from clients 102 and parses the received documents. In this case, management engine 121 dynamically generates one or more JSP pages based, at least in part, on the parsed documents. Management engine 121 may be written in or based on any appropriate computer language including C, C++, Java, Visual Basic, Perl, and others. In some embodiments, management engine 121 comprises one or more Java beans. It will be understood that while management engine 121 and reporting module 118 are each illustrated as single multi-tasked modules, the features and functionality performed by these engines may be performed by one combined application. Moreover, while not illustrated, management engine 121 and reporting module 118 may each comprise a child module of another software application.

In one aspect of operation, client 102 transmits, to server 106, a request to browse the local directory residing on client 102. In some embodiments, server 106 may provide security mechanisms such as requiring a user ID and password to login into the server 106. In some embodiments, legacy system 104 may provide security mechanisms such as requiring a user ID and password to login into legacy system 104. In response to at least the request, server 106 identifies the list of local elements and generates a web page based, at least in part, on the list. In some embodiments, the list includes legacy elements 112. Server 106 transmits the web page to client 102 for presenting a list of local elements to the user. In response to receiving a selection from the user of client 102, client 102 transmits a request to perform an action on a particular legacy element 112 to server 106. For example, the action may request that the particular legacy element 112 be retrieved from, updated in, or added to legacy system 104. In the case of adding an element to legacy system 104, the element may include an indication that it should be transferred in its native format. In this case, the element is transmitted and added to legacy system 104 independent of conversion engine 118. Based, at least in part, on the requested action, management engine 121 executes the requested action in legacy system 104 using API 119. Management engine 121 may also determine whether the performed action was successful. In this case, management engine 121 may receive, from the legacy system 104, the particular legacy element 112 including results. Prior to transmitting any information to client 102, conversion engine 118 may convert the particular legacy element 112 to a form compatible with client 102. After conversion, management engine 121 transmits the legacy element 112 to client 102. As discussed above, legacy element 112 may include an indication that it should remain in its native form while being transferred to client 102. In this case, management engine 121 transmits legacy element 112 to client 102 independent of conversion engine 118. Client 102 may then apply any post-API actions to the legacy element 112 and transmit the updated legacy element 112 to server 106. Server 106 may dynamically generate a JSP page based, at least in part, on the updated legacy element 112. Server 106 then transmits the JSP page to client 102. The JSP page may include a list of legacy elements 112 and actions performed on those legacy elements 112.

FIGS. 2A-E are example displays for managing legacy elements 112 in accordance with one embodiment of system 100. It will be understood that illustrated web pages 105a-105e, respectively, are for example purposes only. Accordingly, GUI 105 may include or present data, such as actions, reports or list of legacy elements, in any format or descriptive language and each page may present any appropriate data in any layout without departing from the scope of the disclosure.

Figure 2A:
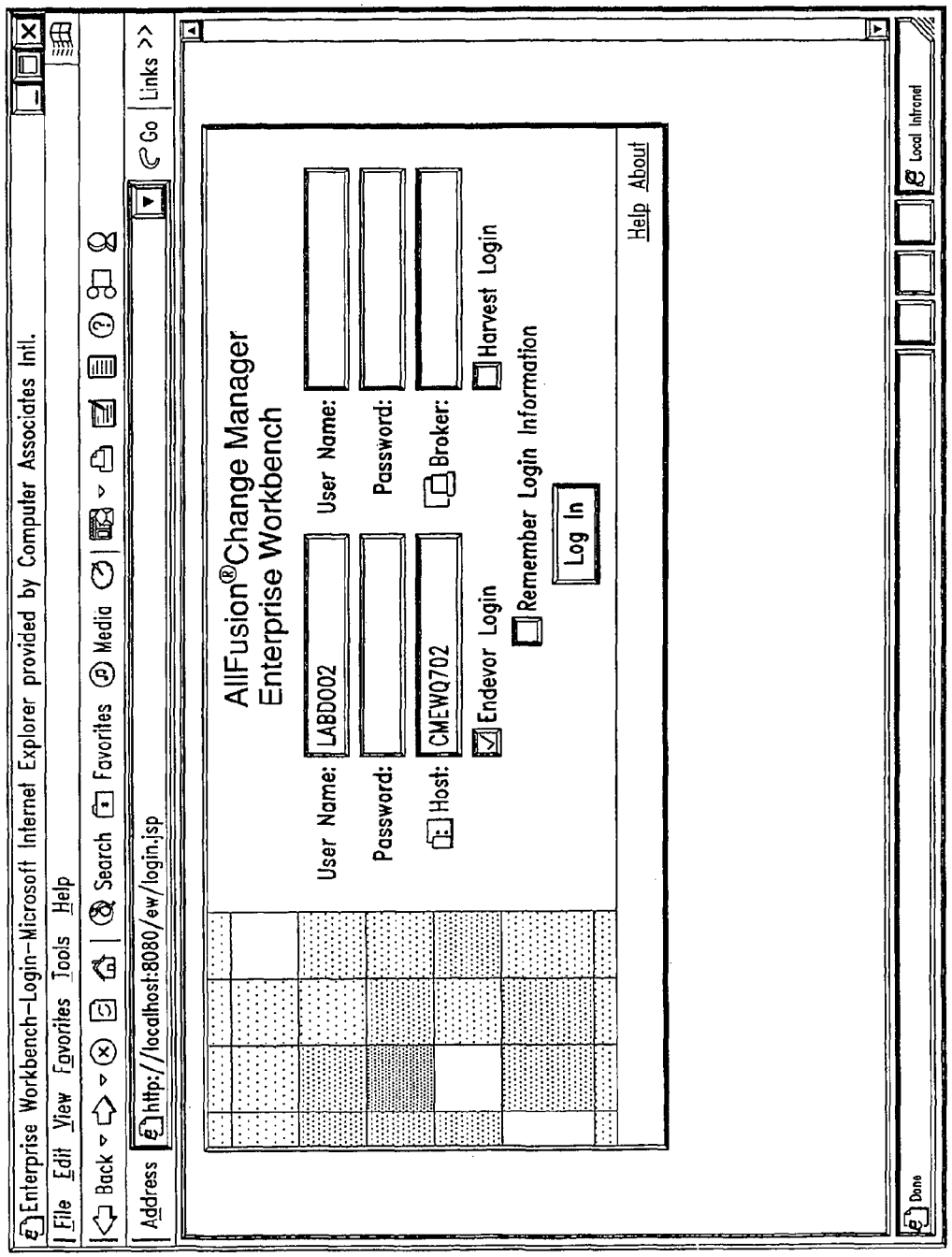
FIGS. 2A-2E are example displays for presenting information associated with legacy elements in the system of FIG. 1 in accordance with one embodiment of the present disclosure.

Turning to the illustrated embodiments, FIG. 2A illustrates an example login view 105a. In this view 105a, the user may be provide an option to login into legacy system 104 and/or server 106. In the legacy case, the user may provide a user name, password, and host identifier in order to login into legacy system 104. In the server case, the user may provide a broker identifier in order to login into server 106. In the event that the user is logging into legacy system 104 for the first time, system 100 may present view 105b as illustrated in FIG. 2B.

Figure 2B:
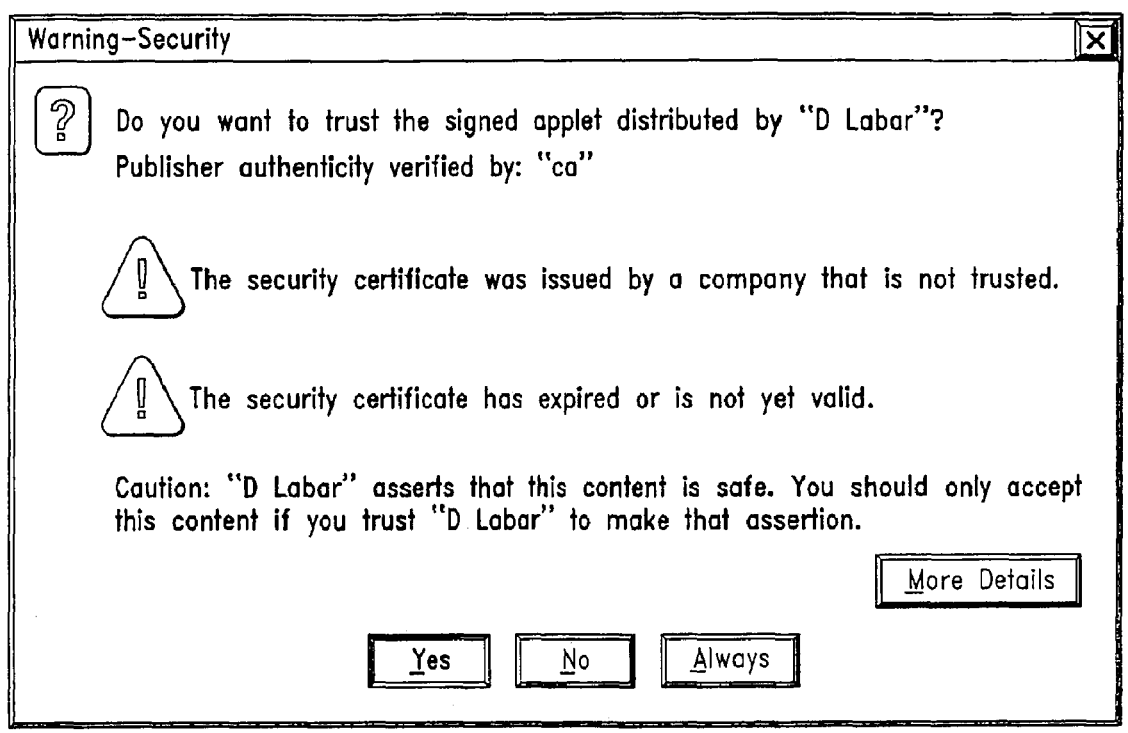

FIG. 2B illustrates an example warning view 105b. In the case, thin client 108 has not been loaded on to client 102. Server 106 may prompt the user whether thin client 108 may be uploaded to thin client 108. For example, view. 105b may be provided to the user upon the first utilization of one of the actions such as add, retrieve, and/or update. As mentioned above, thin client 108 may be a software component initially packaged into a Java Archive file and may be run, for example, as one or more Java Applets under the control of a browser's Java plugin, or other similar technology. In this case, Sun's Java Runtime JRE may be directly downloaded from server 106 in order to execute Applet logic. In the illustrated embodiment, view 105b may indicate what entity is providing thin client 108 and whether another entity has verified the publisher. In addition, view 105b may provide additional information regarding an associated security certificate such as whether it has been issued by a trusted source, has expired, and/or has been validated yet. View 105b may also provide mechanisms for accepting or declining thin client 108 such as graphical buttons. In the illustrated embodiment, the user may select yes, no, always, or request additional information before making a selection.

Figure 2C:
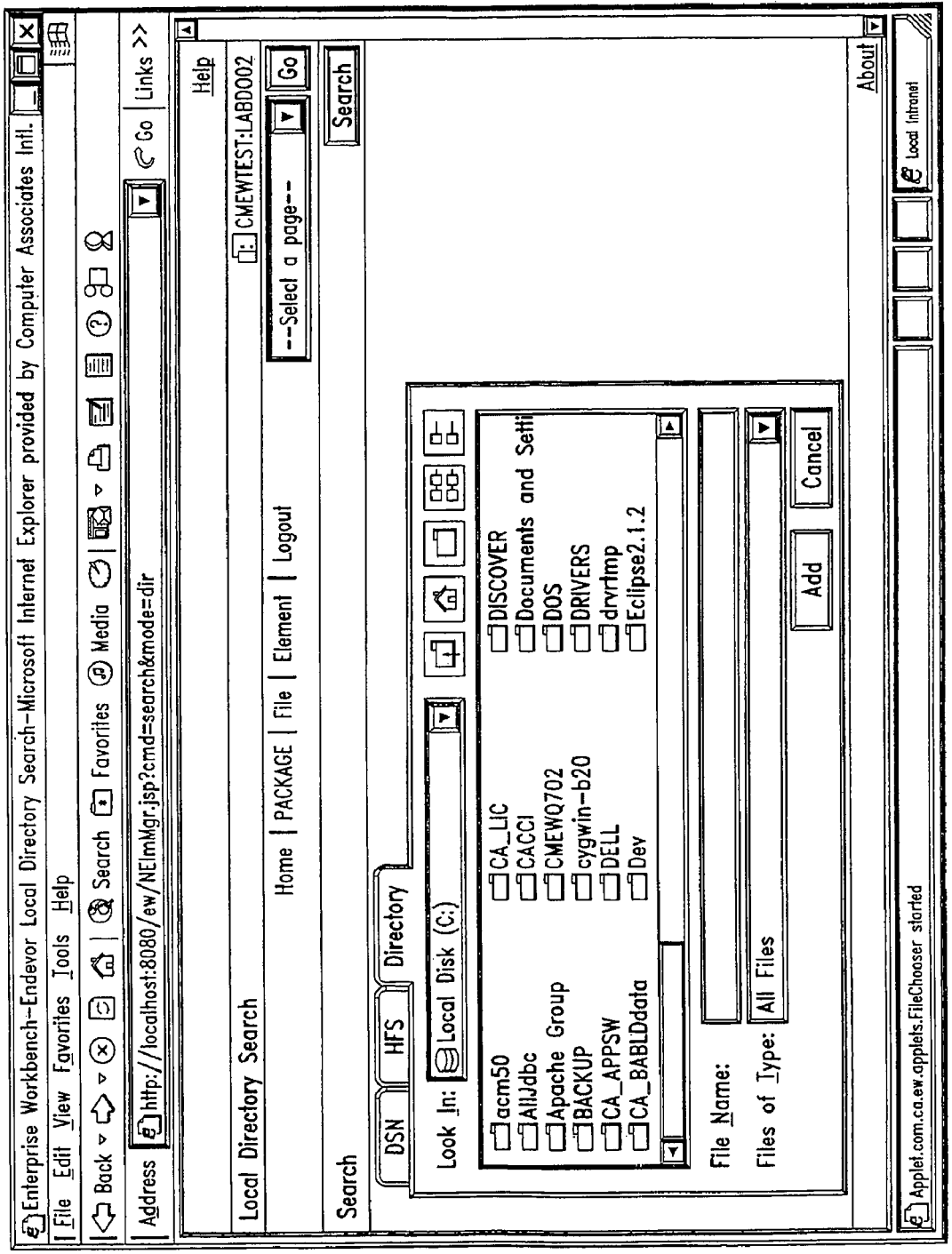

FIG. 2C illustrates an example add view 105c. In this view 105c, the user may exchange elements between clients 102 and legacy systems 104. For example, the user may select elements in the local directory to be added to legacy system 104. In the illustrated embodiment, the "Directory" tab is selected allowing the user to navigate through the local directory of client 102. The user may also select one or more elements to add to legacy system 104. For example, the user may select a particular element and then select the graphical button "Add." The user may perform these steps for additional local elements. As mentioned above, legacy elements 112 may be retrieved from legacy systems 104.

Figure 2D:
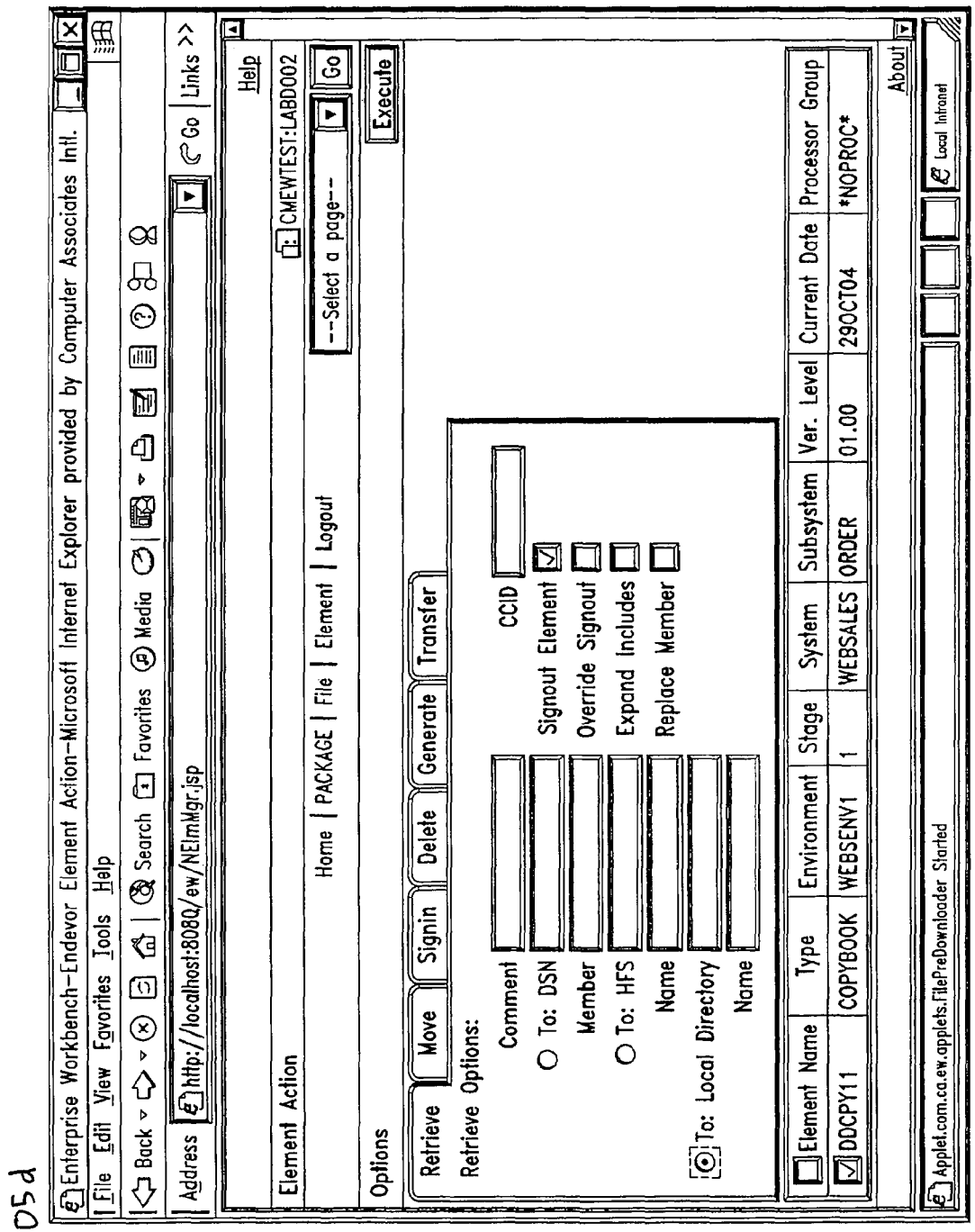

FIG. 2D illustrates an example retrieve view 105d. Prior to providing this view, the user may perform a search for legacy elements 112. This search may be based on one or more of the following parameters: environment, system, sub-system, stage, type, element, CCID, processor group, map indicator, or others. After the search, system 100 may present view 105d that includes a list of identified legacy elements 112 as illustrated in table 202. Table 202 includes a spreadsheet with several columns and rows, with each intersection comprising a cell. Each cell is populated with information associated with the identified legacy elements 112. The illustrated table 202 includes eight columns: element name, type, environment, stage, system, subsystem, version level, current date, and processor group. Table 202 includes a row for each identified legacy element 112. In addition, the user may select the destination of a legacy item using pane 204. In the illustrated embodiment, the local directory is the destination of the legacy element selected in table 202. In the event that the user selects the execute button, system 100 may retrieve the selected legacy element 112 from legacy system 104 and store the selected legacy elements 112 in client 102 in a form compatible with client 102. After this action is performed, system 100 may generate a report associated with the selected legacy element 112.

Figure 2E:
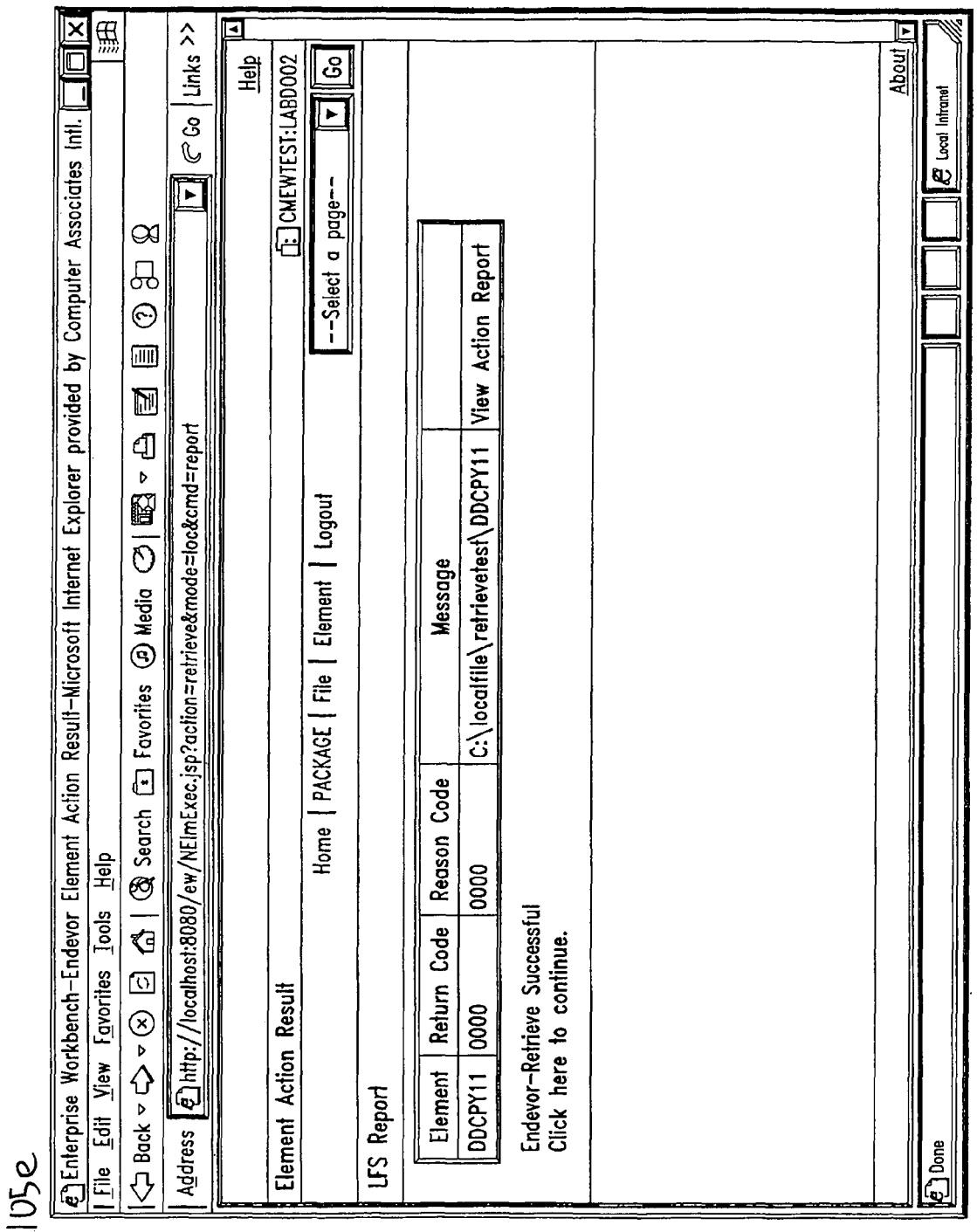

FIG. 2E illustrates an example report view 105e. The user may be able to review the status, of a legacy element 112 and associated actions in view 105e. In the illustrated embodiment, view 105e includes report table 206. Table 206 includes a spreadsheet with several columns and rows, with each intersection comprising a cell. Each cell is populated with information associated with the identified legacy elements 112. The illustrated table 206 includes four columns: element, return code, reason code, and message. Table 206 includes a row for each identified legacy element 112. Table 206 may indicate what actions were attempted on the identified legacy element 112, whether each actions was a success, and if a failure occurs what were the reasons.

FIGS. 3 and 4 are exemplary flow diagrams illustrating methods for managing legacy elements. These methods are described with respect to system 100 of FIG. 1, but these methods could also be used by any other system. Moreover, system 100 may use any other suitable technique for performing these tasks. Thus, many of the steps in this flowchart may take place simultaneously and/or in different orders as shown. Moreover, system 100 may use methods with additional steps, fewer steps, and/or different steps, so long as the methods remained appropriate.

FIGS. 3A and 3B are exemplary flow diagrams illustrating tasks performed by client 102 and server 106, respectively, when an element is added to legacy system 104 or a legacy element 112 is updated. FIG. 3A illustrates method 300 for adding elements to or updating elements in legacy system 104. Method 300 begins at step 302 wherein the browser is loaded. Then, at step 304, client 102 transmits, to server 106, a request to browse local elements residing on client 102. For example, the request may include a list of local elements including legacy elements 112. At step 306, client 102 receives a web page including the list for presentation through GUI 105. Next, at step 308, client 102 transmits a request to perform an action to server 106 on a particular legacy element 112. As mentioned above, the request may be to add a local element to legacy system 104 or update a particular legacy element 112 in legacy system 104. For example, the request may be to update a particular legacy element 112 with an addition and/or a modification. The request may include parameters associated with the requested action. At step 310, client 102 receives the element with results of the action. For example, client 102 may receive an updated legacy element 112 indicating that the updates were successful. Client 102 applies the updates to the legacy element 112 residing in the local directory at step 312. The updated element is transmitted to server 106 at step 314. At step 316, client 102 receives a dynamically generated JSP page based, at least in part, on the updated element. The JSP page may also include links to open action reports for each element and links to browse the element.

Turning to the server side processes, FIG. 3B illustrates an example method 350 identifying the steps performed by server 106 when adding elements to or updating elements in legacy system 104. Method 350 begins at step 352 where server 106 receives a request to browse local file system including a list of elements residing on client 102. At step 354, server 106 identifies the list of elements residing on client 102. Server 106 generates a web page including the list of elements at step 356. This step may include parsing the identified list, validating the list, and storing the list in server 106. Next, at step 358, server 106 receives a request to perform an action on a selected element. As mentioned above, this request may include parameters for adding an element to legacy system 104 or updating a particular legacy element 112 residing in legacy system 104. At step 360, management engine 121 executes the action on the element using API 119. Server 106 receives the result of the actions at step 362. For example, server 106 may receive an indication whether the action was a success or failure. At step 364, conversion 118 converts the legacy element 112 to a form compatible with client 102 and transmits the converted element 112 with results to client 102. Next, at step 366, server 106 receives the element updated with post-API actions performed by client 102. At step 368, server 106 dynamically generates a JSP page using the updated element 112. Server 106 transmits the JSP page to client 102 at step 370.

Figure 4A:
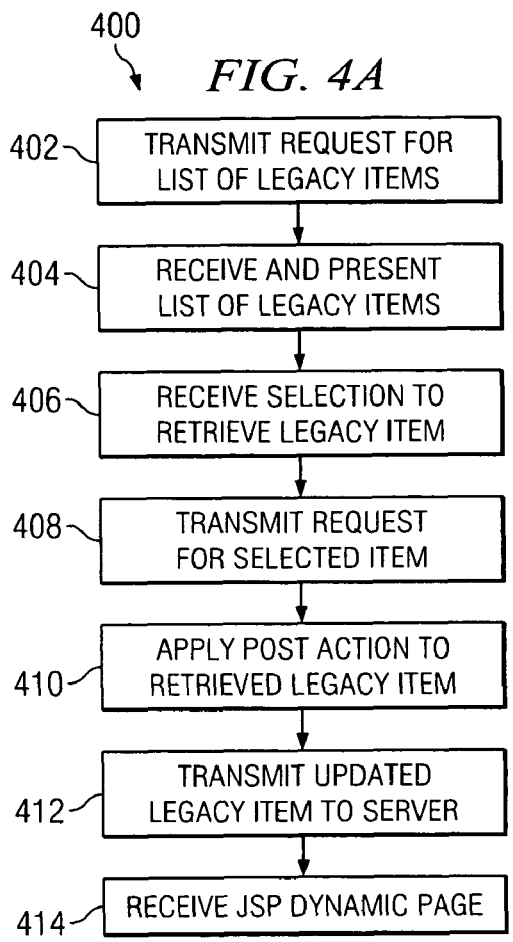
FIGS. 4A and 4B are flow charts illustrating example methods for retrieving elements from legacy system of FIG. 1 in accordance with one embodiment of the present disclosure.
Figure 4B:
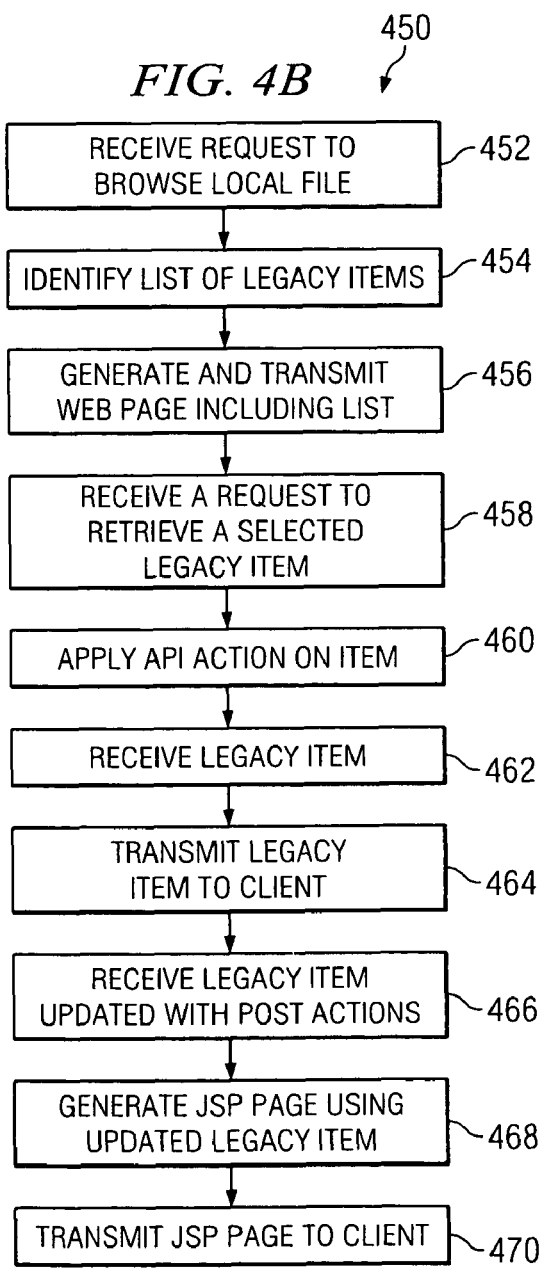

FIGS. 4A and 4B are exemplary flow diagrams illustrating tasks performed by client 102 and server 106, respectively, when a legacy element 112 is retrieved from legacy system 104. FIG. 4A illustrates an example method 400 performed by client 102 when retrieving a legacy element 112. Method 400 begins at step 402 where client 102 transmits a request to browse the local file system. At step 404, client 102 receives and presents a web page with of list of elements including legacy elements 112. Client 102 receives a selection to retrieve a legacy element 112 from legacy system 104 at step 406. At step 408, client 102 transmits a request for the selected legacy element 112 to server 106. Next, at step 410, client 102 receives the converted legacy element 112 and applies any post-API actions on the retrieved legacy element 112. Client 102 then transmits the updated legacy element 112 to server 106 at step 412. At step 414, client 102 receives a dynamically generated JSP page from server 106 based, at least in part, on the update legacy element.

Turning to the server side processes, FIG. 4B illustrates an example method 450 identifying the steps performed by server 106 when retrieving legacy element 112 from legacy system 104. Method 450 begins at step 452 where server 106 receives, from client 102, a request to browse local file system. At step 454, server 106 identifies a list of elements in the local file system based, at least in part, on the request. Next, at step 456, server 106 generates and transmits a web page including the list to client 102. Server 106 receives, from client 102, a request to retrieve a selected legacy element 112 from legacy system 104 at step 458. In response to at least the request, server 106 executes an API action on the particular legacy element 112 using API 119 at step 460. At step 462, server 106 receives the particular legacy element 112 and converts the legacy element 112 to a form compatible with client 102. After conversion, server 106 transmits the converted element to client 102 at step 464. Next, at step 466, server 106 receives, from client 102, the element updated with post-API actions. Based, at least in part, on the updated element, server 106 dynamically generates a JSP page at step 468. Server 106 transmits the JSP page to client 102 at step 470.

Although this disclosure has been described in terms of certain embodiments and generally associated methods, alternatives and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for managing a plurality of data elements, the method executed by one or more processors configured to perform a plurality of operations, the plurality of operations comprising:

receiving, at a server system, from a local system, a request to browse a directory of indicators representing a plurality of data elements, the plurality of data elements including legacy elements in a first form that are stored on a legacy system and local elements in a second form that are stored on the local system, wherein the legacy elements are not processable by the local system in the first form;

identifying, at the server system, one or more local elements of the plurality of data elements and one or more legacy elements of the plurality of data elements;

generating, at the server system, a display of the indicators representing the plurality of data elements, wherein the display indicates that the plurality of data elements reside at the local system;

transmitting the display from the server system to the local system;

receiving a selection at the server system, from the local system, the selection identifying at least one of the plurality of data elements, wherein the at least one of the plurality of data elements includes one or more legacy elements; and executing, by the server system, an action on the one or more legacy elements of the legacy system, wherein the action is based on the selection.

2. The method of claim 1, wherein the selection includes a request to retrieve the one or more legacy elements, and wherein the plurality of operations further comprise:

in response to the request to retrieve the one or more legacy elements, retrieving, by the server system, the one or more legacy elements from the legacy system in the first form of the legacy system using an Application Program Interface (API);

wherein executing the action further comprises converting, at the server system, the one or more legacy elements from the first form of the legacy system to the second form of the local system;

the plurality of operations further comprising transmitting the one or more legacy elements to the local system.

3. The method of claim 1, wherein the selection includes a request to update the one or more legacy elements, and wherein the plurality of operations further comprise:

transmitting the request from the server system to the legacy system using an Application Programming Interface (API);

wherein executing the action further comprises receiving, at the server system, information relating to one or more updated legacy elements;

the plurality of operations further comprising transmitting the one or more updated legacy elements to the local system.

4. The method of claim 3, the request including one or more parameters, wherein the plurality of operations further comprise verifying the one or more parameters prior to transmitting the update request to the legacy system.

5. The method of claim 1, wherein the selection includes a request to add at least one of the local elements to the legacy system, and wherein the plurality of operations further comprise:

converting, at the server system, the at least one local element from the second form of the local system to the first form of the legacy system; and transmitting the at least one local element to the legacy system using an Application Programming Interface (API).

6. The method of claim 1, wherein executing the action on the one or more legacy elements includes:

executing the action with no indication displayed on a user interface of the local system that the legacy system is accessed; and creating a profile for the one or more legacy elements, the profile at least including information relating to execution of the action.

7. The method of claim 6, the plurality of operations further comprising transmitting, from the server system to the local system, a report associated with the action, the report being in a markup language format interpretable by the local system, wherein the report includes information relating to the one or more legacy elements derived from the profile.

8. The method of claim 1, wherein identifying one or more legacy elements further comprises identifying, at the server system, one or more profiles associated with at least one of the one or more legacy elements, the one or more profiles including information relating to the at least one legacy element, and wherein generating a display of the indicators representing the plurality of data elements includes generating the display using at least a portion of the information from the one or more profiles.

9. The method of claim 1, wherein the one or more legacy elements comprise data generated by or for the legacy system, or elements located on the legacy system, and wherein the one or more local elements comprise data generated by or for the local system, or elements located on the local system.

10. A system for managing a plurality of data elements, comprising:

one or more processors configured to:

receive, at a server system, from a local system, a request to browse a directory of indicators representing a plurality of data elements, the plurality of data elements including legacy elements in a first form that are stored on a legacy system and local elements in a second form that are stored on the local system, wherein the legacy elements are not processable by the local system in the first form;

identify, at the server system, one or more local elements of the plurality of data elements and one or more legacy elements of the plurality of data elements;

generate, at the server system, a display of the indicators representing the plurality of data elements, wherein the display indicates that the plurality of data elements reside at the local system;

transmit the display from the server system to the local system;

receive a selection at the server system, from the local system, the selection identifying at least one of the plurality of data elements, wherein the at least one of the plurality of data elements includes one or more legacy elements; and execute, by the server system, an action on the one or more legacy elements of the legacy system, wherein the action is based on the selection.

11. The system of claim 10, wherein the selection includes a request to retrieve the one or more legacy elements, and wherein the one or more processors are further operable to:

in response to the request to retrieve the one or more legacy elements, retrieve, by the server system, the one or more legacy elements from the legacy system in the first form of the legacy system using an Application Program Interface (API);

wherein the action is operable to convert, at the server system, the one or more legacy elements from the first form of the legacy system to the second form of the local system;

the one or more processors further operable to transmit the one or more legacy elements to the local system.

12. The system of claim 10, wherein the selection includes a request to update the one or more legacy elements, and wherein the one or more processors are further operable to:
    transmit the request from the server system to the legacy system using an Application Programming Interface (API);
    wherein the action is operable to receive, at the server system, information relating to the one or more updated legacy elements;
    the one or more processors further configured to transmit the one or more updated legacy elements to the local system.

13. The system of claim 12, the request including one or more parameters, the processors further operable to verify the one or more parameters prior to transmitting the update request to the legacy system.

14. The system of claim 10, wherein the selection includes a request to add at least one of the local elements to the legacy system, and wherein the one or more processors are further operable to:
    convert, at the server system, the at least one local element from the second form of the local system to the first form of the legacy system; and
    transmit the at least one local element to the legacy system using an Application Programming Interface (API).

15. The system of claim 10, wherein the one or more processors are further operable to:
    execute the action with no indication displayed on a user interface of the local system that the legacy system is accessed; and
    create a profile for the one or more legacy elements, the profile including at least including information relating to execution of the action.

16. The system of claim 15, the processors further operable to transmit, from the server system to the local system, a report associated with the action, the report being in a markup language format interpretable by the local system, wherein the report includes information relating to the one or more legacy elements derived from the profile.

17. The system of claim 10, wherein the one or more processors configured to identify one or more legacy elements further comprise one or more processors configured to identify, at the server system, one or more profiles associated with at least one of the one or more legacy elements, the one or more profiles including information relating to the at least one legacy element, and wherein the one or more processors configured to generate a display of the indicators representing the plurality of data elements include one or more processors configured to generate the display using at least a portion of the information from the one or more profiles.

18. The system of claim 10, wherein the one or more legacy elements comprise data generated by or for the legacy system, or elements located on the legacy system, and wherein the one or more local elements comprise data generated by or for the local system, or elements located on the local system.

19. A tangible computer-readable storage medium having computer-executable instructions thereon for managing a plurality of data elements, the computer executable instructions operable to configure one or more processors to:
    receive, at a server system, from a local system, a request to browse a directory of indicators representing a plurality of data elements, the plurality of data elements including legacy elements in a first form that are stored on a legacy system and local elements in a second form that are stored on the local system, wherein the legacy elements are not processable by the local system in the first form;
    identify, at the server system, one or more local elements of the plurality of data elements and one or more legacy elements of the plurality of data elements;
    generate, at the server system, a display of the indicators representing the plurality of data elements, wherein the display indicates that the plurality of data elements reside at the local system;
    transmit the display from the server system to the local system;
    receive a selection at the server system, from the local system, the selection identifying at least one of the plurality of data elements, wherein the at least one of the plurality of data elements includes one or more legacy elements; and
    execute, by the server system, an action on one or more of the legacy elements of the legacy system, wherein the action is based on the selection.

20. The computer-readable medium of claim 19, wherein the selection includes a request to retrieve the one or more legacy elements, and wherein the computer-executable instructions further are operable to configure the one or more processors to:
    in response to the request to retrieve the one or more legacy elements, retrieve, by the server system, the one or more legacy elements from the legacy system in the first form of the legacy system using an Application Program Interface (API);
    wherein the action is operable to convert, at the server system, the one or more legacy elements from the first form of the legacy system to the second form of the local system;
    the computer-executable instructions further being operable to configure the one or more processors to transmit the one or more legacy elements to the local system.

21. The computer-readable medium of claim 19, wherein the selection includes a request to update the one or more legacy elements, and wherein the computer-executable instructions are further operable to configure one or more processors to:
    transmit the request from the server system to the legacy system using an Application Programming Interface (API);
    wherein the action is operable to receive, at the server system, information relating to one or more updated legacy elements;
    the computer-executable instructions further being operable to configure the one or more processors to transmit the one or more updated legacy elements to the local system.

22. The computer-readable medium of claim 21, the request including one or more parameters, the computer-executable instructions further operable to configure one or more processors to verify the one or more parameters prior to transmitting the update request to the legacy system.

23. The computer-readable medium of claim 19, wherein the selection includes a request to add at least one of the local elements to the legacy system, and wherein the computer-executable instructions are further operable to configure one or more processors to:
    convert, at the server system, the at least one local element from the second format of the local system to the first format of the legacy system; and
    transmit the at least one local element to the legacy system using an Application Programming Interface (API).

24. The computer-readable medium of claim 19, the computer-executable instructions further operable to configure one or more processors to:
- execute the action with no indication displayed on a user interface of the local system that the legacy system is accessed; and
- create a profile for the one or more legacy elements, the profile at least including information relating to execution of the action.

25. The computer-readable medium of claim 24, the computer-executable instructions further operable to configure one or more processors to: transmit, from the server system to the local system, a report associated with the action, the report being in a markup language format interpretable by the local system, wherein the report includes information relating to the one or more legacy elements derived from the profile.

26. The computer-readable medium of claim 19, wherein the computer executable instructions operable to configure one or more processors to identify one or more legacy elements further comprise computer executable instructions operable to configure one or more processors to identify, at the server system, one or more profiles associated with at least one of the one or more legacy elements, the one or more profiles including information relating to the at least one legacy element, and wherein the computer executable instructions operable to configure one or more processors to generate a display of the indicators representing the plurality of data elements include computer executable instructions operable to configure one or more processors to generate the display using at least a portion of the information from the one or more profiles.

27. The computer-readable medium of claim 19, wherein the one or more legacy elements comprise data generated by or for the legacy system, or elements located on the legacy system, and wherein the one or more local elements comprise data generated by or for the local system, or elements located on the local system.

* * * * *